United States Patent [19]

Hodakowski et al.

[11] 4,131,602
[45] Dec. 26, 1978

[54] RADIATION CURABLE ACRYLATED POLYURETHANE

[75] Inventors: Leonard E. Hodakowski, St. Albans; Charles H. Carder, Amma, both of W. Va.

[73] Assignee: Union Carbide Corporation, New York, N.Y.

[21] Appl. No.: 837,974

[22] Filed: Sep. 29, 1977

[51] Int. Cl.² .................. C08G 18/67; C08G 18/42; C08G 18/12
[52] U.S. Cl. .................. 528/49; 260/77.5 AM; 260/77.5 AN; 260/77.5 AP; 260/159.19; 204/159.19; 528/59; 528/75
[58] Field of Search .............. 260/77.5 AN, 77.5 AP, 260/75 NP, 77.5 AM, 159.19

[56] References Cited

U.S. PATENT DOCUMENTS

| | | | |
|---|---|---|---|
| 3,642,943 | 2/1972 | Noel | 260/77.5 AM |
| 3,700,643 | 10/1972 | Smith et al. | 260/77.5 AN |
| 3,741,918 | 6/1973 | Koleske et al. | 260/77.5 AN |
| 3,746,665 | 7/1973 | Koleske et al. | 260/77.5 AN |
| 3,782,961 | 1/1974 | Takahashi et al. | 96/115 R |
| 3,891,523 | 6/1975 | Hisamatsu et al. | 260/77.5 AN |
| 3,954,584 | 5/1976 | Miyata et al. | 204/159.23 |
| 4,013,806 | 3/1977 | Volkert et al. | 427/54 |

*Primary Examiner*—H.S. Cockeram
*Attorney, Agent, or Firm*—Peter R. Shearer

[57] ABSTRACT

Radiation curable acrylated polyurethane is porduced by (a) producing an isocyanate-terminated intermediate by coreacting an organic diisocyanate with a combination of organic tri/tetraol and organic diol, said combination being chosen from polyester tri/tetraol-polyether diol and polyether tri/tetraol-polyester diol combinations; (b) reacting the isocyanate-terminated intermediate with an hydroxyacrylate such as 2-hydroxyethyl acrylate. Unexpectedly, the oligomer has desirably low viscosity, yet cures upon exposure to radiation to a coating having good physical properties.

11 Claims, No Drawings

RADIATION CURABLE ACRYLATED POLYURETHANE

BACKGROUND OF THE INVENTION

Increasing restrictions on the amount and types of volatiles which can be released in work environments and the desire to reduce energy consumption have prompted the development of radiation curable coating compositions which are essentially free of volatile solvents that must be evaporated during the curing of the composition. These compositions are said to be 100 percent reactive; that is, each component of the composition reacts and becomes incorporated into the cured coating when the composition is exposed to actinic radiation.

The radiation curable coatings which are disclosed in the prior art typically contain a radiation reactive oligomer or resin, a photoinitiator, and, optionally, a radiation reactive diluent and/or a radiation reactive crosslinker.

A variety of materials are disclosed as being useful as the oligomer or resin component of the radiation curable coating compositions. Among these are polyurethane oligomers or resins having terminal acrylyl or methacrylyl groups. These are generally produced by the reaction of one or more organic polyisocyanates with one or more organic polyols, wherein at least a portion of the polyisocyanate or polyol reactant has, in addition to its isocyanate or hydroxyl functionality, acrylyl or methacrylyl groups. The prior art discloses acrylate or methacrylate capped polyurethanes wherein the organic polyol used in their production is a polyester polyol. For example, U.S. Pat. No. 3,700,643 discloses a number of acrylate capped polyurethanes based on polycaprolactone polyols. The prior art also discloses acrylate or methacrylate capped polyurethanes based on polyether polyols (see, e.g. U.S. Pat. Nos. 3,782,961 and 3,955,584).

It is desirable that the acrylate or methacrylate capped polyurethane employed in the radiation curable coating composition have a sufficiently low viscosity that the coating compositions based thereon are easily applied to a substrate using conventional coating techniques without the excessive use of diluents. Although low molecular weight acrylate or methacrylate monomers, such as 2-ethylhexyl acrylate, 2-hydroxyethyl acrylate, etc., can be used as reactive diluents in conjunction with the oligomer or resin, it is desirable to use as little of these monomers as possible, since these monomers are somewhat toxic and special care must be taken to avoid skin contact with them.

The known acrylate or methacrylate capped polyurethanes based on polyether polyols exhibit desirable low viscosity, however, the radiation cured coatings produced from them do not exhibit the high level of tensile strength, light stability or other performance properties necessary in many end use applications. The known acrylate or methacrylate capped polyurethanes based on polyester polyols impart excellent physical properties to radiation cured coatings, however, they have relatively high viscosities so that undesirably high amounts of the aforementioned diluents must be used in order to achieve the desired application viscosity.

The radiation curable coatings art is seeking a radiation reactive oligomer or resin which has relatively low viscosity, preferably below about 50,000 cps. (23° C.), which, at the same time, imparts good physical properties to a cured coating.

SUMMARY OF THE INVENTION

In accordance with the teachings of this invention there is provided an acrylated or methacrylated polyurethane, suitable for use in radiation curable coating compositions, which exhibits desirably low viscosity, and at the same time, imparts good physical properties to the radiation cured coating. The acrylated or methacrylated polyurethane of this invention is a coreaction product of (a) an organic tri- or tetraol; (b) an organic diol; (c) an organic diisocyanate; and (d) an hydroxyacrylate compound. The organic tri- or tetraol can be a polyester tri- or tetraol, or it can be a polyether tri- or tetraol with the proviso that if the tri- or tetraol is a polyester tri- or tetraol, then the diol is a polyether diol. Conversely, if the tri- or tetraol is a polyether tri- or tetraol, then the diol is a polyester diol.

DESCRIPTION OF THE INVENTION

The organic polyols which can be employed to produce the acrylated or methacrylated polyurethanes of this invention include polyester tri- or tetraols, polyester diols, polyether tri- or tetraols, and polyether diols. The term "tri/tetraols" shall be used herein to encompass triols alone, tetraols alone, or mixtures of triols and tetraols. It is essential to the practice of this invention that the acrylated or methacrylated polyurethane is produced from a combination of diol and tri/tetraol. The combination is chosen from polyester tri/tetraol-polyether diol and polyether tri/tetraol-polyester diol. From the standpoint of imparting good physical properties to cured coatings, we prefer to employ the polyester tri/tetraol-polyether diol combination.

The polyether polyols which can be employed in the production of the acrylated or methacrylated polyurethane of this invention are the di-, tri-, and tetrahydroxy terminated polyoxyalkylenes, e.g. polymers of ethylene oxide, 1,2-propylene oxide, or 1,4-tetramethylene oxide (tetrahydrofuran), preferably a 1,2-alkylene oxide such as polyoxyethylene (polyethylene oxide) or polyoxypropylene (poly(1,2-propylene oxide)). Suitable polyether polyols are produced by known methods, most commonly by the reaction of a di-, tri-, or tetra-functional polyhydric initiator with a molar excess of a 1,2-alkylene oxide such as ethylene oxide or 1,2-propylene oxide. The polyhydric initiators are well known and include diethylene glycol, 1,4-butanediol, neopentyl glycol, trimethylol ethane, trimethylol propane, glycerol, 1,2,4-butanetriol, pentaerythritol, erythritol, and the like, the functionality of the initiator being selected to correspond to the desired functionality of the polyether polyol. A low molecular weight polyester polyol, i.e., having a molecular weight below about 400, can be employed as the initiator provided that the residue of the polyester polyol initiator in the polyether polyol chain does not constitute more than about 10 weight percent thereof.

Those skilled in the art will recognize that the ratio of 1,2-alkylene oxide to polyhydric initiator is determinative of the average molecular weight of the resultant polyether polyol. Although it is not narrowly critical to the practice of this invention, it is preferred that the polyether polyol component have an average molecular weight of from about 300 to 4,000, most preferably from 400 to 1,500. This is true whether the polyether polyol constitutes the tri/tetraol reactant or the diol reactant.

The polyester polyols which are suitably employed in the production of the acrylated or methacrylated polyurethane of this invention are any of the well known, di-, tri-, or tetrahydroxy terminated polyesters.

One can mention, as being illustrative of suitable polyester polyols, those obtained by reacting a polyhydric initiator, such as those mentioned above in connection with the production of polyether polyols, with a molar excess of a lactone of the formula:

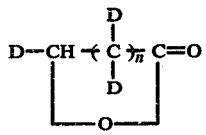

In the formula above, n is an integer having a value from about 3 to about 6, at least n+2 of the D's are hydrogen and the remaining D's are each lower alkyl (1-6 carbons). Such polylactone polyols are known and widely employed in the polyurethanes art and any such monomer or mixture of such monomers can be used. Included among the lactone monomers which can be reacted with the polyhydric initiator to produce the polylactone polyols are epsilon-caprolactone; zeta-enantholactone; delta-valerolactone, the monoalkyl-delta-valerolactones, e.g., the monomethyl-, monoethyl-, monohexyl- delta-valero-lactones, and the like; the monoalkyl- dialkyl-, and trialkyl-epsilon-caprolactones, e.g. the monomethyl-, monoethyl-, monohexyl-, di-methyl, diethyl-, di-n-propyl-, di-n-hexyl, trimethyl-, triethyl-, tri-n-propyl-epsilon-caprolactones, and the like.

Another class of polyester polyols which can suitably be employed are those produced by the poly-condensation reactions of dicarboxylic acids or their anhydrides with di-, tri-, or tetra-alcohols. Suitable dicarboxylic acids or anhydrides include adipic, pimelic, suberic, azelaic, sebacic, brassic, brassylic, rosselic, glutaric, maleic, fumaric, itaconic, and propenyl succinic acids or the corresponding anhydrides. The selection of dicarboxylic acids or anhydrides, and alcohols, and the amounts thereof, are made to provide the desired functionality and molecular weight in the polyester polyol. A low molecular weight polyether polyol, i.e., having a molecular weight of below about 400, can be employed as a polyhydric initiator in the production of the polyester polyol, provided the residue of the polyether polyol initiator in the polyester polyol chain does not constitute more than about 10 weight percent thereof. Although it is not narrowly critical to the practice of this invention, it is preferred that the polyester polyol employed in the production of the acrylated or methacrylated polyurethane of this invention have a molecular weight of from about 300 to 4,000, most preferably from about 300 to 2,000. This is true whether the polyester polyol constitutes the tri/tetraol reactant or the diol reactant.

The organic diisocyanates which can be employed in the practice of this invention are known to those skilled in the art and any such compounds containing two free NCO groups are suitably employed. Among such compounds are the aliphatic, cycloaliphatic, and aromatic diisocyanates. Usually, the aromatic diisocyanates are used in applications not requiring a high degree of light stability. Illustrative of suitable organic diisocyanates are 2,2,4-trimethyl-hexamethylene diisocyanate; 2,4,4-trimethylhexamethylene diisocyanate; 1,4-hexamethylene diisocyanate; 1,6-hexamethylene diisocyanate; 4,4-methylene-bis(cyclohexylisocyanate); bis-2-isocyanato-ethyl) fumarate; 2,4-tolylene diisocyanate; 2,6-tolylene diisocyanate; 4,4'-diphenylmethane diisocyanate; 6-isopropyl-1,3-phenyldiisocyanate; durylene diisocyanate; 4,4'-diphenylpropane diisocyanate; 3,5,5-trimethyl-3-isocyanate-methyl-cyclohexane-diisocyanate; 1,3- and 1,4-xylylene diisocyanate; 1-methyl-2,4-diisocyanatocyclohexane; 5,6-bicyclo (2.2.1)-hept-2-ene diisocyanate, and the like.

The hydroxyacrylate or hydroxymethacrylate which is useful in the practice of this invention is represented by the formula:

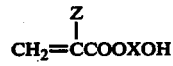

wherein Z is hydrogen or methyl and X is a linear or branched divalent alkylene of 1 to 10 carbon atoms, preferably 2 to 6 carbon atoms; cycloalkylene of 5 to 12 carbon atoms, preferably 6 to 8 carbon atoms; or arylene of 6 to 12 carbon atoms. For example, the hydroxyacrylate or hydroxymethacrylate can be hydroxyethyl acrylate, hydroxypropyl acrylate, hydroxybutyl acrylate, hydroxyethyl methacrylate, hydroxypropyl methacrylate, hydroxybutyl methacrylae, 4-hydroxycyclohexyl acrylate, 4-hydroxycyclohexyl methacrylate, 5-hydroxycyclooctyl acrylate, 5-hydroxycyclooctyl methacrylate, and the like.

In preparing the acrylated or methacrylated polyurethane, the mole ratio of organic diol to organic tri/tetraol employed is from 1:1 to 7:1, preferably from 1:1 to 3:1.

The reaction sequence which produces the acrylated or methacrylated polyurethane of this invention has two stages. In the first stage, the organic tri/tetraol and the organic diol are reacted with an equivalent excess of the organic diisocyanate to produce an isocyanate-terminated intermediate. In the second stage of the reaction sequence, the isocyanate-terminated intermediate is reacted with the hydroxyacrylate or hydroxymethacrylate compound to produce the acrylated or methacrylated polyurethane.

In the first stage of the reaction sequence, the organic tri/tetraol and organic diol can be simultaneously reacted with the organic diisocyanate or the organic tri/-tetraol and organic diol can be sequentially reacted. For example, the organic tri/tetraol can first be reacted with all or a portion of the organic diisocyanate and the reaction product thereof can then be reacted with the organic diol and the remainder of the organic diisocyanate. Alternatively, the organic diol can first be reacted with all or a portion of the organic diisocyanate and the reaction product thereafter reacted with the organic tri/tetraol and the remainder of the organic diisocyanate. As yet another alternative, the organic tri/tetraol and organic diol can be preblended and reacted with the organic diisocyanate in a single step. The order of reaction in the first stage of the reaction sequence is not critical. In the first stage, the organic diisocyanate is employed in equivalent excess to the total amount of organic tri/tetraol and organic diol. By "equivalent excess" is meant that the ratio of isocyanate groups to hydroxyl groups is at least greater than 1:1 and can be up to about 2:1, preferably up to about 1.3:1.

In the second stage, the hydroxyacrylate or hydroxymethacrylate is reacted with the isocyanate-terminated intermediate in a reaction which takes place at the free isocyanate groups of the intermediate. The amount of hydroxyacrylate or hydroxymethacrylate which is employed is such that at least about 80% of the free isocyanate groups of the intermediate are reacted.

The reaction sequence which produces the acrylated or methacrylated polyurethane will be readily understood by those skilled in the art as will the conditions under which it proceeds. Generally, the reaction can be carried out at a temperature of from about 30 to 80° C., preferably from about 35 to 60° C.

Normally, a catalyst is employed during both stages of the reaction sequence. The suitable catalysts, and their effective concentrations, are well known to those skilled in the art. They include triethyldiamine, morpholine, N-ethylmorpholine, piperazine, triethanolamine, triethylamine, N,N,N',N',-tetramethylbutane-1,3-diamine, dibutyltin dilaurate, stannous octoate, dioctyltin diacetate, lead octoate, stannous oleate, stannous tallate, dibutyltin oxide, etc.

The reaction sequence can be carried out in the presence of a suitable organic solvent. The organic solvent can be a conventional chemically inert solvent such as 2-ethoxyethyl acetate, xylene, or toluene. However, it is preferred to employ a reactive solvent which can be employed as a component of a 100 percent reactive coating composition together with the acrylated or methacrylated polyurethane. When an inert reaction solvent is employed, the acrylated or methacrylated polyurethane is recovered therefrom by conventional recovery techniques before employing it in a 100 percent reactive coating composition.

The acrylated or methacrylated polyurethane per se can be used as a coating material or it can be used as a major component of a radiation curable coating composition in conjunction with other components such as reactive solvents, crosslinkers, and photoinitiators. The acrylated or methacrylated polyurethane of this invention is generally employed in the radiation curable coating composition at a concentration of from 20 to 80 weight percent, preferably from 35 to 65 weight percent thereof.

Suitable reactive solvents which can be employed in the radiation curable coating composition are defined by the formula

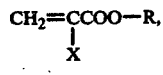

wherein X is hydrogen or methyl and R can be substituted or unsubstituted alkyl, cycloalkyl, alkenyl, aryl, or aralkyl, wherein the substituent can be alkoxy, hydroxy, cyano, or amino, or R can be carbamoyloxy alkyl which can be N-alkyl substituted.

Illustrative of suitable reactive solvents one can mention: alkyl acrylates having up to about 12 carbon atoms in the alkyl segment such as ethyl acrylate, butyl acrylate, 2-ethylhexyl acrylate, amyl acrylate, n-lauryl acrylate, nonyl acrylate, n-octyl acrylate, isooctyl acrylate, isodecyl acrylate, etc.; alkoxyalkyl acrylates such as methoxybutyl acrylate, ethoxyethyl acrylate, ethoxypropyl acrylate, etc.; hydroxyalkyl acrylates such as hydroxyethyl acrylate, hydroxybutyl acrylate, etc.; alkenyl acrylates such as trimethoxyallyloxymethyl acrylate, allyl acrylate, etc.; aralkyl acrylates such as phenoxyethyl acrylate, benzyl acrylate, etc.; cycloalkyl acrylates such as cyclohexyl acrylate, cyclopentyl acrylate, isobornyl acrylate, etc.; aminoalkyl acrylates such as diethylaminoethyl acrylate; cyanoalkyl acrylates such as cyanoethyl acrylate, cyanopropyl acrylate, etc.; carbamoyloxy alkyl acrylates such as 2-carbamoyloxyethyl acrylate, 2-carbamoyl-oxypropyl acrylate, N-methylcarbamoyloxyethyl acrylate, N-ethylcarbamoyloxymethyl acrylate, 2-(N-methylcarbamoyloxy)-ethyl acrylate, 2-(N-ethylcarbamoyloxy)ethyl acrylate, etc.; and the corresponding methacrylates.

The concentration of reactive solvent in the radiation curable coating composition can be from zero to about 40 weight percent, preferably from about 5 to 25 weight percent. The concentration used is selected so as to obtain the desired application viscosity in the coating composition.

If desired, the radiation curable coating composition can contain a reactive crosslinking agent. The suitable crosslinking agents are known to those skilled in the art and preferably are chosen from the low molecular weight polyfunctional acrylate or methacrylate esters having molecular weights below about 1,200, preferably below about 600.

The low molecular weight polyfunctional acrylate or methacrylate esters are any of the di-, tri-, or tetraacrylate esters of acrylic acid or methacrylic acid with the di-, tri-, or tetra-alcohols. One can mention, as being merely illustrative thereof, neopentyl glycol diacrylate, 3'-acryloxy-2',2'-dimethylpropyl 3-acryloxy-2, 2-dimethylpropionate, 1,6-hexanediol diacrylate, pentaerythritol triacrylate, ethylene glycol diacrylate, diethylene glycol diacrylate, trimethylol propane triacrylate, pentaerythritol tetraacrylate, and the like, the reaction product of 2 moles of a hydroxyalkyl acrylate, e.g. 2-hydroxyethyl acrylate, and 1 mole of an organic diisocyanate, or the corresponding methacrylates.

The concentration of reactive crosslinking agent in the radiation curable coating composition can be from zero to 80 weight percent, preferably from 0 to 30 weight percent.

When the radiation curable coating composition is to be cured by exposure to non-ionizing radiation, e.g. ultraviolet, there is present in the composition a photoinitiator, which can be present at a concentration of up to about 20 weight percent of the radiation curable composition, and is preferably present at a concentration of from 0.1 to 10 weight percent, most preferably from 1 to 5 weight percent thereof. The suitable photoinitiators are well known in the art. One can mention, as illustrative thereof 2,2-diethoxyacetophenone, 2- or 3- or 4-bromoacetophenone, 3- or 4-bromoacetophenone, benzaldehyde, benzoin, the allyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, 1,3-diphenyl-2-propanone, 1,4-naphthylphenylketone, 2,3-pentanedione, propiophenone, chlorothioxanthone, xanthone and the like, or a mixture of these.

Those skilled in the art of photochemistry are fully aware that so-called "photoactivators" or "photosynergists" can be used in combination with the aforementioned photoinitiators and that synergistic effects are sometimes achieved when such combinations are used. Photoactivators are well known to those skilled in the art and require no further description herein for them to know what they are. Nonetheless, one can mention as illustrative of suitable photoactivators methylamine, tributylamine, N-methyldiethanolamine, 2-aminoethylethanolamine, allylamine, cyclohexylamine, diphenylamine, ditolylamine, trixylylamine, tribenzylamine, n-cyclohexylethylenimine, piperadine, N-methylpiperazine, 2,2-dimethyl-1,3-bis-(3-N-morpholinyl)propionyloxy propane, and the like, or any mixture of these. The photoactivators, when used, are employed in the usual effective amounts which are known to those skilled in the art (see, e.g. U.S. Pat. No. 3,795,807).

In addition to the foregoing components, the improved 100 percent reactive coating compositions can also contain conventional additives such as pigments, wetting agents, flatting agents, etc., which are employed in the usual known effective concentrations.

The 100 percent reactive coating compositions are produced by conventional methods by mixing the selected components together. To facilitate preparation one can apply a small amount of heat. The coatings can be applied by conventional means, including spray, curtain, dip pad, roll-coating and brushing procedures. The coatings can be applied to any acceptable substrate such as wood, metal, glass, fabric, paper, fiber, plastic, etc.

The applied radiation curable coating composition can be cured by any of the known actinic radiation curing methods such as exposure to ultraviolet light, x-rays, alpha particles, electron beam, or gamma rays. Irradiation can be performed using any of the known and commonly available types of radiation curing equipment, for example, curing may be done by low, medium or high pressure mercury arc lamps or with a swirlflow plasma arc radiation source by the process disclosed in U.S. Pat. No. 3,650,699. Curing can be carried out in air or in an inert atmosphere such as nitrogen or argon. Exposure time required to cure the composition varies somewhat depending on the specific formulation, type and wavelength of radiation, energy flux, concentration of photoinitiator, and film thickness. Those skilled in the art of radiation technology will be able to determine the proper curing time for any particular composition. Generally, the cure time is rather short, that is, less than about 20 seconds.

The following examples are presented in order to further illustrate the invention described herein.

EXAMPLE 1

Preparation of acrylated polyurethane based on polyether diol/polyester triol

To a 3-liter, four-neck flask fitted with a stirrer, thermometer, condenser and dropping funnel there were charged 555 grams of isophorone diisocyanate, 0.3 grams of dibutyltin dilaurate, and 940 grams of 2-(N-methylcarbamoyloxy)ethyl acrylate. The mixture in the flask was heated to 40° C. and there was added a mixture of 450 grams of poly-epsilon-caprolactone triol (av. wt. 900; av. hydroxyl no. 187 mg. KOH/g.; acid no. 0.25) and 1,000 grams of polyoxypropylene glycol (av. m. wt. 1,000; av. hydroxyl no. 111.4 mg. KOH/g.; acid no. 0.1). The mixture of poly-epsilon-caprolactone triol and polyoxypropylene glycol was added at a rate which maintain the reaction temperature at between 45° and 55° C. There were then fed to the flask 187.5 grams of 2-hyroxyethyl acrylate. The reaction was continued with stirring until the free isocyanate level was 0.18 weight percent.

EXAMPLE 2

Preparation of acrylated polyurethane based on polyether triol/polyester diol

To a 3-liter, four-neck flask fitted with a stirrer, thermometer, condenser, and dropping funnel there were charged 555 grams of isophorone diisocyanate, 697 grams of 2-(N-methylcarbamoyloxy)ethyl acrylate, and 0.25 grams of dibutyltin dilaurate. The contents of the flask were heated to 41° C. There was then added to the flask a polyol mixture consisting of 354 grams of polyoxypropylene triol av. m. wt. 708; av. hydroxyl no. 237.5; acid no. 0.05) and 530 grams of poly-epsilon-caprolactone diol (av. m. wt. 530; av. hydroxyl no. 212 mg. KOH/g.; acid no. 0.4). The polyol mixture was fed at a rate which maintained the reaction temperature below 55° C. After addition of the polyol mixture was complete, 187.5 grams of 2-hydroxyethyl acrylate were added and the reaction was continued until the free isocyanate content reached a level of 0.6 weight percent.

EXAMPLE 3

Preparation of acrylated polyurethane based on polyestertetraol/polyether diol

To a 5-liter, four-neck flask fitted with a stirrer, thermometer, condenser and dropping funnel there were charged 266 grams of isophorone diisocyante, 639 grams of 2-(N-methylcarbamoyloxy)ethyl acrylate and 2 grams of dibutyltin dilaurate. The contents of the flask were heated to 45° C. and there was added to the flask a polyol mixture consisting of 324 grams of poly-epsilon-caprolactone tetraol (av. m. wt. 1,635; av. hydroxyl no. 137; acid no. 0.13) and 800 grams of polyoxypropylene glycol (av. m. wt. 2,000; av. hydroxyl no. 56.1 mg. KOH/g.; acid no. 0.1). The polyol mixture was added at a rate which maintained the reaction temperature below 55° C. After addition of the polyol mixture was complete, 100 grams of 2-hydroxyethyl acrylate were added and the reaction was continued until the free isocyanate level was 0.02 weight percent.

EXAMPLE 4

A series of three radiation curable coating compositions were produced using the acrylated polyurethanes of Examples 1 and 2 by mixing to a uniform consistency the components indicated in the table below. The viscosity of each coating composition was determined using a Brookfield model LVT viscometer with a No. 3 spindle. Each coating composition was drawn down on release paper to a thickness of about 4 mils using a stainless steel rod. The coating composition on the substrate was cured by 1.9 seconds of exposure to medium pressure mercury arc lamps delivering 500 watts/ft.$^2$ Tensile properties are given in the table below. Formulation A, which contained no diluent other than residual 2-(N-methylcarbamoyloxy)ethyl acrylate which was employed as a reaction medium in the production of the acrylated polyurethane, displayed a surprising combination of application viscosity and tensile properties. While the tensile strength of Formulation B was considerably lower, it was nonetheless within the useful range for many commercial end uses. Generally, the coatings of the examples showed an unexpectedly good combination of tensile properties and desirably low application viscosity in view of the low concentrations of monoacrylate diluents employed.

| FORMULATION | p.b.w. | | |
|---|---|---|---|
| | A | B | C |
| Acrylated polyurethane of Ex. 1 | 99 | — | 57 |
| Acrylated polyurethane of Ex. 2 | — | 99 | — |
| 2,2-di-secbutoxyacetophenone | 1 | 1 | 1 |
| 2-(N-methylcarbamoyloxy)ethyl acrylate | — | — | 30.5 |
| Silicone slip additive* | — | — | 0.5 |
| Ethylene glycol acrylate phthalate | — | — | 5 |
| N-vinyl pyrrolidone | — | — | 3 |
| 2-phenoxyethyl acrylate | — | — | 8 |
| Crosslinker** | — | — | 5 |
| Viscosity, cps. at 25° C. | 25,800 | 6,640 | 864 |
| Tensile strength, p.s.i. | 1,800 | 400 | 1,900 |
| Elongation, % | 105 | 80 | 130 |

*(CH$_3$)$_3$SiO—(CH$_3$SiO)$_{3.2}$—((CH$_3$)$_2$SiO—)$_{20}$Si(CH$_3$)$_3$

|
—(CH$_2$)$_3$(OC$_3$H$_6$)$_{14}$(OC$_2$H$_4$)$_{19}$OC$_4$H$_9$

**Adduct of 1 mol. isophorone diisocyanate and 2 mol. 2-hydroxyethyl acrylate (85 wt. % in 2-(N-methylcarbamoyloxy)ethyl acrylate.

What is claimed is:

1. An acrylated or methacrylated polyurethane produced by the process which comprises the steps of:
   (A) producing an isocyanate-terminated urethane intermediate by reacting
      (i) an organic diisocyanate;
      (ii) an organic tri/tetraol chosen from the group consisting of polyester tri/tetraols and polyether tri/tetraols; and
      (iii) an organic diol chosen from the group consisting of polyester diols and polyether diols, said organic diisocyanate being employed in equivalent excess to said organic tri/tetraol and organic diol; the ratio of organic diol to organic tri/tetraol employed being from about 1:1 to about 7:1; and provided that when the organic tri/tetraol is a polyester tri/tetraol the organic diol is a polyether diol, and when the organic tri/tetraol is a polyether tri/tetraol the organic diol is polyester diol; then
   (B) reacting the isocyanate-terminated urethane produced in step (A) with a sufficient amount of an hydroxyacrylate or hydroxymethacrylate to react at least 80% of the isocyanate groups of the intermediate, said hydroxyacrylate or hydroxymethacrylate having the formula $$CH_2=\overset{Z}{\overset{|}{C}}COOXOH$$

wherein Z is hydrogen or methyl and X is linear or branched divalent alkylene of 1 to 10 carbon atoms, cycloalkylene of 5 to 12 carbon atoms, or arylene of 6 to 12 carbon atoms.

2. An acrylated or methacrylated polyurethane as claimed in claim 1, wherein said polyether tri/tetraol and polyether diol have a molecular weight of from 300 to 4,000.

3. An acrylated or methacrylated polyurethane as claimed in claim 1, wherein said polyether tri/tetraol and polyether diol have a molecular weight of from 400 to 1,500.

4. An acrylated or methacrylated polyurethane as claimed in claim 1, wherein said polyester tri/tetraol and polyester diol have a molecular weight of from 300 to 4,000.

5. An acrylated or methacrylated polyurethane as claimed in claim 1, wherein the polyester tri/tetraol and polyester diol have a molecular weight of from 300 to 2,000.

6. An acrylated or methacrylated polyurethane as claimed in claim 1, wherein said organic tri/tetraol is a polyester tri/tetraol having a molecular weight of from 300 to 4,000 and said organic diol is a polyether diol having a molecular weight of from 300 to 4,000.

7. An acrylated or methacrylated polyurethane as claimed in claim 6, wherein said polyester tri/tetraol is a polylactone tri/tetraol.

8. An acrylated or methacrylated polyurethane as claimed in claim 7, wherein the polyether diol is polyoxypropylene diol.

9. An acrylated or methacrylated polyurethane as claimed in claim 1, wherein the mole ratio of organic diol to organic tri/tetraol is from 1:1 to 3:1.

10. An acrylated or methacrylated polyurethane as claimed in claim 1, wherein the equivalent ratio of organic diisocyanate to organic tri/tetraol and organic diol is at least greater than 1:1 up to about 2:1.

11. An acrylated or methacrylated polyurethane as claimed in claim 1, wherein the equivalent ratio of organic diisocyanate to organic tri/tetraol is at least greater than 1:1 up to about 1.3:1.

* * * * *